United States Patent
Fukuhara et al.

(10) Patent No.: US 11,958,954 B2
(45) Date of Patent: *Apr. 16, 2024

(54) MULTILAYER STRUCTURE (71) Applicant: KURARAY CO., LTD., Kurashiki (JP)

(72) Inventors: Tadahito Fukuhara, Tsukuba (JP); Tatsuya Tanida, Frankfurt am Main (DE)

(73) Assignee: KURARAY CO., LTD., Kurashiki (JP)

( * ) Notice: Subject to any disclaimer, the term of this patent is extended or adjusted under 35 U.S.C. 154(b) by 416 days.

This patent is subject to a terminal disclaimer.

(21) Appl. No.: 17/260,809

(22) PCT Filed: Jul. 17, 2019

(86) PCT No.: PCT/JP2019/028016
§ 371 (c)(1),
(2) Date: Jan. 15, 2021

(87) PCT Pub. No.: WO2020/017527
PCT Pub. Date: Jan. 23, 2020

(65) Prior Publication Data
US 2021/0292502 A1  Sep. 23, 2021

(30) Foreign Application Priority Data
Jul. 18, 2018  (JP) .................... 2018-135337

(51) Int. Cl.
*C08J 7/048* (2020.01)
*B05D 7/04* (2006.01)
(Continued)

(52) U.S. Cl.
CPC ............... *C08J 7/048* (2020.01); *B05D 7/04* (2013.01); *C08F 216/06* (2013.01);
(Continued)

(58) Field of Classification Search
None
See application file for complete search history.

(56) References Cited

U.S. PATENT DOCUMENTS 5,240,997 A * 8/1993 Yanai .................... B29C 48/00
525/60
5,352,750 A * 10/1994 Yanai .................... C08J 5/18
526/71
(Continued)

FOREIGN PATENT DOCUMENTS

EP   2 508 343 A1   10/2012
EP   3 168 242 A1   5/2017
(Continued)

OTHER PUBLICATIONS

International Search Report dated Oct. 1, 2019 in PCT/JP2019/028016 filed Jul. 17, 2019, 2 pages.
(Continued)

*Primary Examiner* — Vivian Chen
(74) *Attorney, Agent, or Firm* — Oblon, McClelland, Maier & Neustadt, L.L.P.

(57) ABSTRACT

There is provided a multilayer structure comprising a layer (A) containing an ethylene-vinyl alcohol copolymer having an ethylene unit content of 1 mol % or more and less than 20 mol %, a viscosity-average polymerization degree of 200 to 5000, and a saponification degree of 80 to 99.7 mol %, wherein a block character of ethylene units is 0.90 to 0.99; and a layer (B) containing at least one resin selected from the group consisting of a polyolefin resin, a polyester resin and a polyamide resin. Such a multilayer structure has excellent oxygen-gas barrier performance. In addition, an aqueous solution containing the ethylene-vinyl alcohol copolymer exhibits excellent viscosity stability even after long-term storage. Therefore, even after a long period of time from preparation of the aqueous solution, it can be uniformly (Continued)

applied to a substrate and thus, a multilayer structure having excellent oxygen-gas barrier performance can be provided.

6 Claims, 2 Drawing Sheets

(51) Int. Cl.
| | |
|---|---|
| B32B 7/12 | (2006.01) |
| B32B 27/08 | (2006.01) |
| B32B 27/30 | (2006.01) |
| B32B 27/32 | (2006.01) |
| B32B 27/34 | (2006.01) |
| B32B 27/36 | (2006.01) |
| C08F 216/02 | (2006.01) |
| C08F 216/06 | (2006.01) |
| C08J 7/04 | (2020.01) |
| C09D 129/04 | (2006.01) |

(52) U.S. Cl.
CPC ......... *C08J 7/0427* (2020.01); *B05D 2201/02* (2013.01); *B05D 2350/60* (2013.01); *B05D 2401/20* (2013.01); *B05D 2507/015* (2013.01); *B32B 7/12* (2013.01); *B32B 27/08* (2013.01); *B32B 27/304* (2013.01); *B32B 27/306* (2013.01); *B32B 27/308* (2013.01); *B32B 27/32* (2013.01); *B32B 27/34* (2013.01); *B32B 27/36* (2013.01); *B32B 2250/02* (2013.01); *B32B 2250/24* (2013.01); *B32B 2255/10* (2013.01); *B32B 2255/26* (2013.01); *C08F 216/02* (2013.01); *C08J 7/042* (2013.01); *C08J 2367/02* (2013.01); *C08J 2423/08* (2013.01); *C09D 129/04* (2013.01); *Y10T 428/3175* (2015.04); *Y10T 428/31797* (2015.04); *Y10T 428/31909* (2015.04); *Y10T 428/31913* (2015.04)

(56) References Cited

U.S. PATENT DOCUMENTS

| | | | |
|---|---|---|---|
| 6,303,199 | B1 | 10/2001 | Takada et al. |
| 2003/0087982 | A1* | 5/2003 | Kanazawa .......... H01M 50/423 |
| | | | 522/89 |
| 2009/0149593 | A1* | 6/2009 | Funabiki ............. C08L 23/0876 |
| | | | 524/442 |
| 2012/0237747 | A1 | 9/2012 | Tai et al. |
| 2017/0183426 | A1 | 6/2017 | Kawai et al. |
| 2017/0261133 | A1 | 9/2017 | Nakamura et al. |
| 2021/0108111 | A1* | 4/2021 | Tanida .................... C08L 29/04 |
| 2022/0176953 | A1* | 6/2022 | Ito ............................. B60R 1/00 |
| 2022/0259467 | A1* | 8/2022 | Taoka ..................... C09J 129/04 |
| 2022/0259468 | A1* | 8/2022 | Imaoka .................. C09J 131/04 |
| 2023/0118744 | A1* | 4/2023 | Kaharu ................ C09D 101/02 |
| | | | 525/56 |
| 2023/0142880 | A1* | 5/2023 | Taoka .................... D21H 19/12 |
| | | | 428/511 |
| 2023/0257491 | A1* | 8/2023 | Inubushi .................. C08F 8/12 |
| | | | 525/56 |

FOREIGN PATENT DOCUMENTS

| | | | |
|---|---|---|---|
| EP | 3 192 650 A1 | | 7/2017 |
| EP | 3783039 A1 | * | 2/2021 |
| JP | 05-059116 A | * | 3/1993 |
| JP | 05-078404 A | * | 3/1993 |
| JP | 08-081666 A | * | 3/1996 |
| JP | 11-21320 A | | 1/1999 |
| JP | 2000-52501 A | | 2/2000 |
| JP | 2000-119585 A | | 4/2000 |
| JP | 2000-218725 A | | 8/2000 |
| JP | 2001-172593 A | | 6/2001 |
| JP | 2008-239848 A | | 10/2008 |
| JP | 2009-84316 A | | 4/2009 |
| WO | WO 2019/203216 A1 | * | 10/2019 |

OTHER PUBLICATIONS

Extended European Search Report dated Mar. 17, 2022 in European Patent Application No. 19838693.0, 9 pages.
U.S. Appl. No. 17/047,855, filed Oct. 15, 2020, Tanida et al.

\* cited by examiner

MULTILAYER STRUCTURE

TECHNICAL FIELD

The present invention relates to a multilayer structure exhibiting excellent oxygen-gas barrier performance comprising a layer containing an ethylene-vinyl alcohol-copolymer having a block character of ethylene units in a particular range, a production method therefor, and a packaging material therewith.

BACKGROUND ART

A multilayer structure exhibiting excellent oxygen-gas barrier performance has been used as a packaging material and the like. Aluminum foil has perfect oxygen-gas barrier performance, and therefore, is used as an intermediate layer of such a multilayer structure. However, there are problems that when a multilayer structure containing aluminum foil is incinerated, residue is left, and that when the multilayer structure is used as a packaging material, a content is invisible and cannot be examined by a metal detector.

A polyvinylidene chloride (hereinafter, sometimes abbreviated as "PVDC") is less moisture absorbent and has good oxygen-gas barrier performance even under high humidity. Therefore, a multilayer structure comprising a variety of substrates coated with a polyvinylidene chloride has been used as a packaging material and the like. As the substrate, a film such as a biaxially oriented polypropylene (hereinafter, sometimes abbreviated as "OPP"), a biaxially oriented Nylon (hereinafter, sometimes abbreviated as "ON"), a biaxially oriented polyethylene terephthalate (hereinafter, sometimes abbreviated as "OPET") and a cellophane is used. However, there has been a problem that when a waste PVDC-containing multilayer structure is incinerated, hydrogen chloride gas is generated.

It is known that a fully saponified unmodified polyvinyl alcohol (hereinafter, "polyvinyl alcohol" is sometimes abbreviated as "PVA") exhibits excellent oxygen-gas barrier performance. However, the unmodified PVA is hygroscopic and thus its oxygen-gas barrier performance tends to deteriorate under high humidity. Furthermore, the unmodified PVA has problem that it is less adhesive to an OPP or an OPET used for a substrate. As a method for restricting moisture absorption, there are proposed coating both sides of a PVA film with a PVDC, and using an ethylene-vinyl alcohol copolymer containing 20 mol % or more of ethylene units. However, there has been a problem that when a PVDC-containing multilayer structure is incinerated, chlorine gas is generated. Furthermore, when an ethylene-vinyl alcohol copolymer containing mol % or more of ethylene units is applied to a substrate, uniformity of a resulting coating film of the multilayer structure is insufficient in some cases.

Patent Reference No. 1 has described a film comprising a PVA containing 3 to 19 mol % of α-olefin units having 4 or less carbon atoms. It has described that the film exhibits excellent water resistance and excellent oxygen-gas barrier performance even under high humidity. However, the film still has insufficient oxygen-gas barrier performance in some cases. A coating agent which is an aqueous solution of the PVA has poor viscosity stability. Therefore, after a long period of time from preparation, the coating agent cannot be evenly applied to a substrate, so that oxygen-gas barrier performance of a multilayer structure obtained may be insufficient.

PRIOR ART REFERENCE

Patent Reference

Patent Reference No. 1: JP 2000-119585 A

SUMMARY OF THE INVENTION

Problems to be Solved by the Invention

To solve the above problems, an objective of the present invention is to provide a multilayer structure in which an aqueous solution containing the ethylene-vinyl alcohol copolymer used for production thereof exhibits excellent viscosity stability even after long-term storage, and which has excellent oxygen-gas barrier performance.

Means for Solving the Problems

The above problems can be solved by a multilayer structure comprising a layer (A) containing an ethylene-vinyl alcohol copolymer having an ethylene unit content of 1 mol % or more and less than 20 mol %, a viscosity-average polymerization degree of 200 to 5000, and a saponification degree of 80 to 99.7 mol %, wherein a block character of ethylene units is 0.90 to 0.99; and a layer (B) containing at least one resin selected from the group consisting of a polyolefin resin, a polyester resin and a polyamide resin.

Here, it is preferable that a thickness of the layer (A) is 0.1 to 20 μm.

It is preferable that the layer (A) further contains 0.000001 to 0.01 parts by mass of a compound having a conjugated double bond with a molecular weight of 1000 or less based on 100 parts by mass of the ethylene-vinyl alcohol copolymer.

The above problems can be also solved by providing a method for producing a multilayer structure, comprising a step of preparing an aqueous solution of the ethylene-vinyl alcohol copolymer to give a coating agent, and a step of applying the coating agent to a surface of a substrate made of at least one selected from the group consisting of a polyolefin resin, a polyester resin and a polyamide resin. Here, it is preferable that after 1 to 30 days from preparing the coating agent, the coating agent is applied to the surface of the substrate.

A suitable embodiment of the present invention is a packaging material having the multilayer structure.

Effects of the Invention

A multilayer structure of the present invention comprising a layer containing an ethylene-vinyl alcohol copolymer in which a block character of ethylene units is within a predetermined range exhibits excellent oxygen-gas barrier performance. In addition, an aqueous solution containing the ethylene-vinyl alcohol copolymer exhibits excellent viscosity stability even after long-term storage. Therefore, even after a long period of time from preparation of the aqueous solution, it can be uniformly applied to a substrate and thus, a multilayer structure having excellent oxygen-gas barrier performance can be provided.

MODES FOR CARRYING OUT THE INVENTION

[Layer (A)]

A layer (A) constituting a multilayer structure of the present invention contains an ethylene-vinyl alcohol copolymer in which a block character of ethylene units meets predetermined conditions.

(Ethylene-Vinyl Alcohol Copolymer)

An ethylene-vinyl alcohol copolymer contained in a layer (A) is an ethylene-vinyl alcohol copolymer having an ethylene unit content of 1 mol % or more and less than 20 mol %, a viscosity-average polymerization degree of 200 to 5000, and a saponification degree is 80 to 99.7 mol %, wherein a block character of ethylene units in the ethylene-vinyl alcohol copolymer is 0.90 to 0.99.

(Block Character of Ethylene Units)

An outstanding characteristic of an ethylene-vinyl alcohol copolymer used in the present invention is that a block character of ethylene units is 0.90 to 0.99. With the block character being within such a range, oxygen-gas barrier performance of a multilayer structure obtained is improved. A block character of ethylene units is suitably 0.93 or more, more suitably 0.95 or more. Meanwhile, if a block character of ethylene units is less than 0.90, hydrophobicity is so high that after a long period of time from preparation, an aqueous solution of such an ethylene-vinyl alcohol copolymer cannot be uniformly applied to a substrate, resulting in deterioration in oxygen-gas barrier performance of a multilayer structure obtained. If a block character of ethylene units is more than 0.99, hydrophilicity is so high that oxygen-gas barrier performance of a multilayer structure obtained is deteriorated. It is, therefore, important that a block character is within a proper range.

A block character is a numerical value indicating distribution of ethylene units and vinyl alcohol units formed by saponification of vinyl ester units, and which has a value of 0 to 2. "0" indicates that ethylene units or vinyl alcohol units are distributed as a block. As the value increases, alternating property increases. "1" indicates that ethylene units and vinyl alcohol units are completely randomly present. "2" indicates that ethylene units and vinyl alcohol units are completely alternately present. A block character can be determined by $^{13}$C-NMR as described below. First, an ethylene-vinyl alcohol copolymer is saponified to a saponification degree of 99.9 mol % or more, fully washed with methanol, and dried at 90° C. under reduced pressure for 2 days. The completely saponified ethylene-vinyl alcohol copolymer obtained is dissolved in DMSO-$d_6$, and the resulting sample was subjected to measurement using a 500 MHz $^{13}$C-NMR spectrometer (JEOL GX-500) at 80° C.

Using a molar fraction of a vinyl alcohol-ethylene two-unit chain (AE), a molar fraction of vinyl alcohol units (A), and a molar fraction of ethylene units (E) assigned and calculated from the obtained spectrum as described in T. Moritani and H. Iwasaki, 11, 1251-1259, Macromolecules (1978), a block character (η) of ethylene units is determined according to the following equation:

$$\eta = (AE)/\{2 \times (A) \times (E)\}$$

An ethylene-vinyl alcohol copolymer having a block character of ethylene units as defined above can be produced by a special method comprising a polymerization step and a saponification step described later. After intense investigation, the inventors have achieved that a block character of ethylene units can be controlled by employing such a production method. The inventors have further found that with a block character of ethylene units being within the above range, the above-mentioned effects can be obtained. An ethylene-vinyl alcohol copolymer used in the present invention will be further detailed below.

(Vinyl Ester)

An ethylene-vinyl alcohol copolymer used in the present invention is produced by copolymerizing ethylene and a vinyl ester to give an ethylene-vinyl ester copolymer and then saponifying the ethylene-vinyl ester copolymer. Examples of a vinyl ester which can be used include vinyl formate, vinyl acetate, vinyl propionate, vinyl valerate, vinyl caprate, vinyl laurate, vinyl stearate, vinyl benzoate, vinyl pivalate and vinyl versatate, particularly preferably vinyl acetate.

(Ethylene Unit Content)

A content of ethylene units in an ethylene-vinyl alcohol copolymer used in the present invention is 1 mol % or more and less than 20 mol %. If a content of ethylene units is less than 1 mol %, a multilayer structure obtained exhibits insufficient oxygen-gas barrier performance. A content of ethylene units is suitably 1.5 mol % or more, more suitably 2 mol % or more. If a content of ethylene units is 20 mol % or more, an ethylene-vinyl alcohol copolymer is insoluble in water, and preparation of an aqueous solution becomes difficult. A content of ethylene units is suitably 15 mol % or less, more suitably 10 mol % or less, further suitably 8.5 mol % or less.

A content of ethylene units is determined, for example, by $^1$H-NMR of a precursor of an ethylene-vinyl alcohol copolymer or an ethylene-vinyl ester copolymer as a re-acetylation product as described below. A sample of the ethylene-vinyl ester copolymer is reprecipitation-purified three or more times using a mixed solution of n-hexane and acetone, and dried at 80° C. for three days to prepare an ethylene-vinyl ester copolymer for analysis. The ethylene-vinyl ester copolymer is dissolved in DMSO-$d_6$ followed by $^1$H-NMR (500 MHz) analysis at 80° C. A content of ethylene units can be calculated using peaks derived from a main-chain methine of the vinyl ester (4.7 to 5.2 ppm) and peaks derived from a main-chain methylene of ethylene and the vinyl ester (0.8 to 1.6 ppm).

(Saponification Degree)

A saponification degree of ethylene-vinyl alcohol copolymer used in the present invention is 80 to 99.7 mol %. If a saponification degree is less than 80 mol %, a multilayer structure obtained exhibits insufficient oxygen-gas barrier performance. A saponification degree is suitably 85 mol % or more, more suitably 90 mol % or more. On the other hand, if a saponification degree is more than 99.7 mol %, an ethylene-vinyl alcohol copolymer cannot be stably produced. A saponification degree is suitably 99.5 mol % or less. A saponification degree of an ethylene-vinyl alcohol copolymer can be determined in accordance with JIS K6726 (1994).

(Viscosity-Average Polymerization Degree)

A viscosity-average polymerization degree of an ethylene-vinyl alcohol copolymer used in the present invention is 200 to 5000. If a viscosity-average polymerization degree is less than 200, it is difficult to produce a multilayer structure. A viscosity-average polymerization degree is suitably 250 or more, more suitably 300 or more, further suitably 400 or more. If a viscosity-average polymerization degree is more than 5000, an aqueous solution of an ethylene-vinyl alcohol copolymer becomes too viscous to be handled. A viscosity-average polymerization degree is suitably 4500 or less, more suitably 4000 or less, further suitably 3500 or less. A viscosity-average polymerization degree P can be determined in accordance with JIS K6726 (1994). Specifically, an ethylene-vinyl alcohol copolymer used in the present invention is re-saponified to a saponification degree of 99.5 mol % or more and purified, and then P can be calculated by the following equation using a limiting viscosity [η] (L/g) as determined in water at 30° C.

$$P=([\eta]\times 10000/8.29)^{(1/0.62)}$$

(Other Monomer Units)

An ethylene-vinyl alcohol copolymer used in the present invention can contain other monomer units other than vinyl alcohol units, ethylene units and vinyl ester units as long as the effects of the present invention are not impaired. Examples of such other monomer units include units derived from α-olefins such as propylene, n-butene and isobutylene; acrylic acid and salts thereof; acrylic acid esters; methacrylic acid and salts thereof; methacrylic acid esters; acrylamides; acrylamide derivatives such as N-methylacrylamide, N-ethylacrylamide, N,N-dimethylacrylamide, diacetone acrylamide, acrylamide propanesulfonic acid and salts thereof, acrylamide propyldimethylamine and salts or quaternary salts thereof, N-methylol acrylamide and derivatives thereof; methacrylamide; methacrylamide derivatives such as N-methylmethacrylamide, N-ethylmethacrylamide, methacrylamide propanesulfonic acid and salts thereof, methacrylamide propyldimethylamine and salts or quaternary salts thereof, N-methylol methacrylamide and derivatives thereof; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether; nitriles such as acrylonitrile and methacrylonitrile; halogenated vinyls such as vinyl chloride and vinyl fluoride; halogenated vinylidenes such as vinylidene chloride and vinylidene fluoride; allyl compounds such as allyl acetate and allyl chloride; unsaturated dicarboxylic acids and salts or esters thereof such as maleic acid, itaconic acid and fumaric acid; vinylsilyl compounds such as vinyltrimethoxysilane; and isopropenyl acetate. A content of these other monomer units is, depending on an objective or use thereof, suitably 10 mol % or less, more suitably less than 5 mol %, further suitably less than 1 mol %, particularly suitably less than 0.5 mol %.

(Method for Producing an Ethylene-Vinyl Alcohol Copolymer)

A suitable method for producing an ethylene-vinyl alcohol copolymer used in the present invention is a method for producing the ethylene-vinyl alcohol copolymer by reacting ethylene with a vinyl ester to give an ethylene-vinyl ester copolymer and then saponifying the ethylene-vinyl ester copolymer, comprising, in production of the ethylene-vinyl ester copolymer, (a) the step of contacting a solution containing the vinyl ester with an ethylene-containing gas while stirring the solution with a wide paddle blade in a polymerization tank such that a stirring power Pv per unit volume is 0.5 to 10 kW/m³ and a Froude number Fr is 0.05 to 0.2.

By contacting a solution containing a vinyl ester with an ethylene-containing gas in such a manner, a block character of ethylene units of an ethylene-vinyl alcohol copolymer can be within the above range. There will be detailed the production method.

(Polymerization Step)

In the polymerization step, ethylene is reacted (copolymerized) with a vinyl ester to give an ethylene-vinyl ester copolymer. Copolymerization of ethylene and a vinyl ester is preferably conducted by a solution polymerization wherein ethylene and the vinyl ester are copolymerized in an organic solvent such as an alcohol. Examples of the alcohol include lower alcohols such as methanol and ethanol, particularly preferably methanol. An initiator used for the polymerization can be selected from known initiators such as azo initiators and peroxide initiators including 2,2'-azobis (isobutyronitrile), 2,2'-azobis(4-methoxy-2,4-dimethylvaleronitrile), 2,2'-azobis(2,4-dimethyl-valeronitrile), benzoyl peroxide and n-propyl peroxydicarbonate.

In the polymerization, a chain transfer agent can coexist for adjusting a viscosity-average polymerization degree of the resulting ethylene-vinyl ester copolymer. Preferable examples of a chain transfer agent include aldehydes such as acetaldehyde, propionaldehyde, butylaldehyde and benzaldehyde; ketones such as acetone, methyl ethyl ketone, hexanone and cyclohexanone; mercaptans such as 2-hydroxyethane thiol; thiocarboxylic acids such as thioacetic acid; and halogenated hydrocarbons such as trichloroethylene and perchloroethylene. Inter alia, aldehydes and ketones can be suitably used. The amount of the chain transfer agent depends on a chain transfer constant of the chain transfer agent added and a targeted viscosity-average polymerization degree of an ethylene-vinyl ester copolymer, and generally it is 0.1 to 10 parts by mass based on 100 parts by mass of a vinyl ester used.

Polymerization can be carried out by any style of continuous polymerization, batch polymerization and semi-batch polymerization. A polymerization reactor can be a continuous tank reactor, a batch reactor, a tube reactor or the like, preferably a continuous tank reactor.

Figure 1:
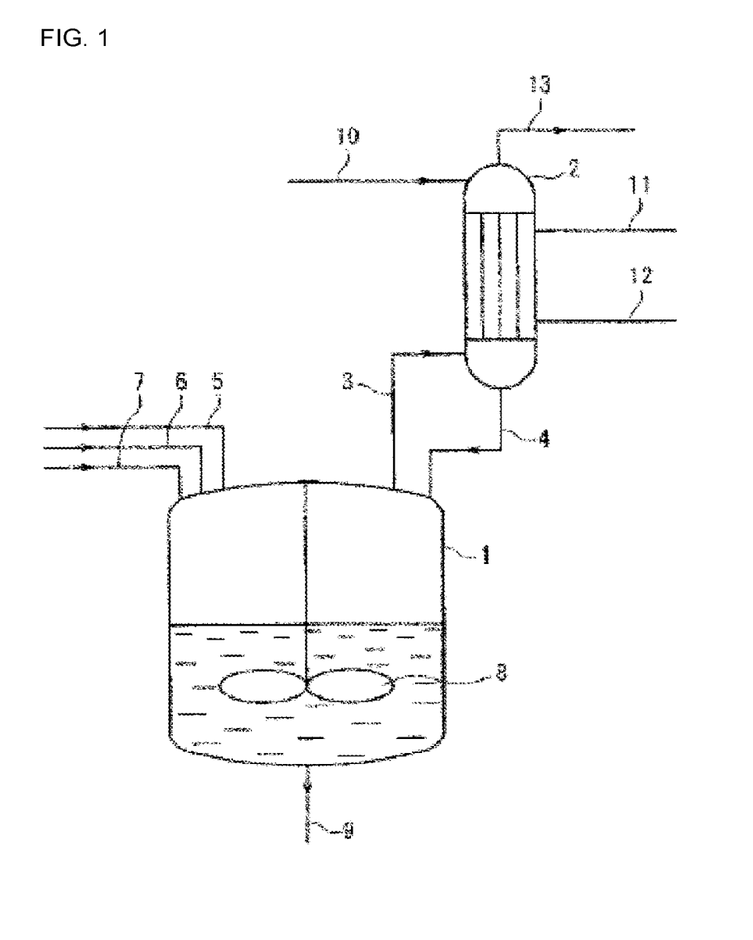
FIG. 1 is a schematic view of a polymerization apparatus used in Examples.

There will be described a specific polymerization apparatus and a polymerization step using the apparatus with reference to FIGs. FIG. 1 is a schematic view of a polymerization apparatus used in Example 1. The apparatus is a continuous tank reactor in which a polymerization tank 1 is connected to a heat exchanger 2 via pipes 3, 4. In the heat exchanger 2, a vinyl ester can be brought into flow contact with ethylene.

A plurality of pipes pipe 5, 6, 7 are connected to the polymerization tank 1. The number and arrangement of the pipes are not limited to those shown in the figure. Ethylene, a polymerization initiator and an organic solvent are fed to the polymerization tank 1 via these pipes. A rate of a starting material introduced into the polymerization tank per unit time is preferably 0.1 to 20 parts by mass for ethylene, 1 to 100 parts by mass for an organic solvent, and 0.00001 to 1 part by mass for a polymerization initiator based on 100 parts by mass of a vinyl ester. In some cases, a vinyl ester and other monomers can be fed via these pipes. A reaction liquid in the polymerization tank 1 is continuously discharged from a reaction liquid outlet pipe 9 connected to the bottom of the polymerization tank 1.

The inside of the polymerization tank 1 is equipped with a stirrer 8 having a wide paddle blade as a stirring blade. While a solution containing a vinyl ester is stirred with the wide paddle blade, the solution is in contact with an ethylene-containing gas for reaction of ethylene with the vinyl ester, to give an ethylene-vinyl ester copolymer.

Figure 2:
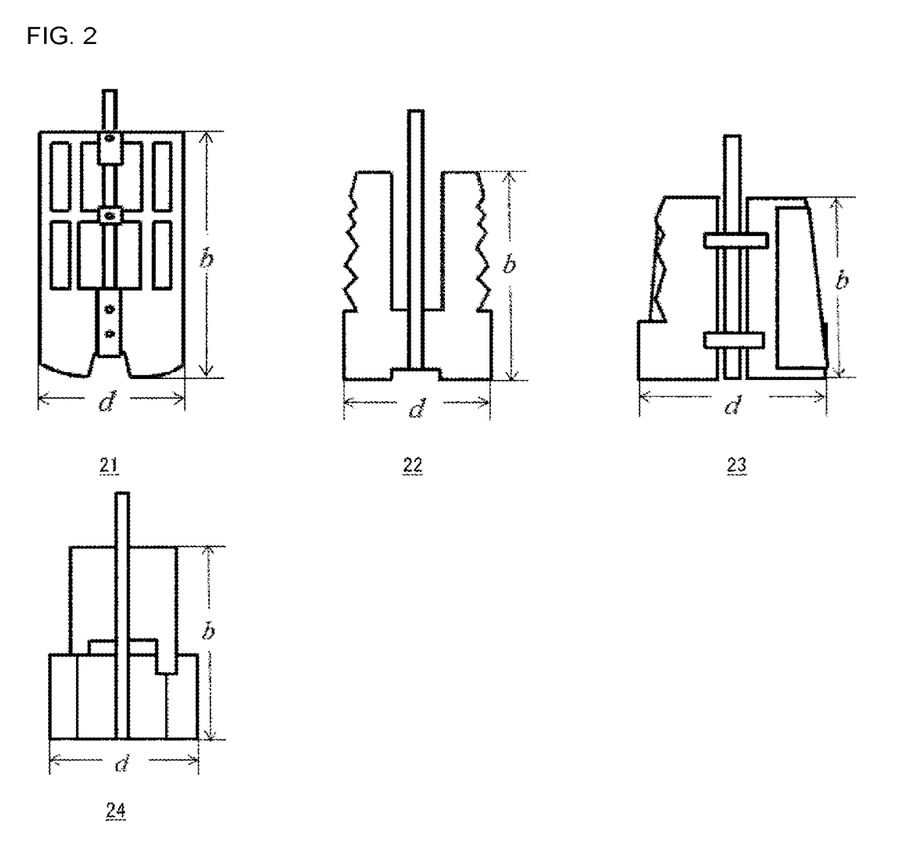
FIG. 2 is a schematic view of an exemplary wide paddle blade used in the present invention:
21: Maxblend blade
22: Supermix MR203
23: Supermix MR205
24: Fullzone blade.

It is preferable to use a wide paddle blade as a stirring blade for stirring the solution containing a vinyl ester. FIG. 2 is a schematic view of a wide paddle blade used in the present invention. As shown in FIG. 2, a wide paddle blade is characterized in that it has a wide paddle with a width of "b". The width "b" of the wide paddle blade can be appropriately adjusted, depending on a volume of the polymerization tank 1 and the like, and is preferably 1 to 10 m as described later. By using such a paddle, the solution can be homogeneously mixed from the bottom to the liquid surface, and also ethylene can be efficiently absorbed by the solution containing a vinyl ester. The wide paddle blade can be of a single blade type (for example, Maxblend blade), or of a multi-blade type (for example, Fullzone blade). In the light of further efficient absorption of ethylene into the vinyl ester, it is preferable that during stirring the solution containing the vinyl ester, the liquid level of the solution is near the upper end of the stirring blade. Specific examples of the wide paddle blade include Maxblend blade (Sumitomo Heavy Industries Process Equipment Co., Ltd.), Fullzone blade (Kobelco Eco-Solutions Co., Ltd.), Sanmeler blade (Mitsubishi Heavy Industries), Hi-Fi mixer blade (Soken Chemical & Engineering Co., Ltd.), Supermix blade (Satake Chemical Equipment Mfg., Ltd., Supermix MR203, Supermix MR205), and Bendleaf blade (Hakko Sangyo Co., Ltd.).

An ethylene pressure in a polymerization reactor during polymerization is preferably 0.01 to 0.9 MPa, more preferably 0.05 to 0.8 MPa, further preferably 0.1 to 0.7 MPa. A polymerization ratio at an outlet of a polymerization reactor is, but not limited to, preferably 10 to 90%, more preferably 15 to 85%.

A polymerization temperature is, but not limited to, preferably 0 to 180° C., more preferably 20 to 160° C., further preferably 30 to 150° C.

When ethylene is reacted with a vinyl ester, it is preferable to stir a solution containing a vinyl ester such that in a polymerization tank, a stirring power Pv per unit volume in the solution is 0.5 to 10 kW/m³. If a stirring power is less than 0.5 kW/m³, the amount of ethylene incorporated in a vinyl ester is insufficient and a reaction liquid is insufficiently homogeneous, so that an ethylene-vinyl alcohol copolymer having a block character of ethylene units within the above range cannot be obtained. A stirring power is more suitably 1 kW/m³ or more, further suitably 1.5 kW/m³ or more. If a stirring power is more than 10 kW/m³, power used for operation becomes very large, which is industrially unfavorable. A stirring power is more suitably 7 kW/m³ or less, further suitably 5 kW/m³ or less. A stirring power Pv per unit volume for a solution containing a vinyl ester can be determined by a method described in Examples later.

Froude number Fr is a ratio of inertial force to gravity as defined by the following equation, which is an indicator for vortex shape in a liquid surface.

$$Fr = n^2 \times d/g$$

n: rotation number of a stirring blade (rps)
d: stirring blade diameter (m)
g: gravity acceleration (m/s²)

When ethylene is reacted with a vinyl ester, it is preferable to stir a solution containing a vinyl ester such that in a polymerization tank, Froude number Fr is 0.05 to 0.2. By regulating Froude number Fr within the above range for controlling vortex shape in the liquid surface, ethylene is moderately absorbed by a vinyl ester, so that it would easily give an ethylene-vinyl alcohol copolymer having a block character of ethylene units within the above range. Froude number Fr is more suitably 0.06 or more, further suitably 0.07 or more. Froude number Fr is more suitably 0.18 or less, further suitably 0.15 or less. Froude number Fr can be controlled to be within the above range by appropriately varying a rotation number or a diameter of the stirring blade.

There are no particular restrictions to a stirring blade diameter "d" of the wide paddle blade as long as a stirring power Pv and Froude number Fr are within the above ranges, and it is preferably 0.5 to 5 m in the light of improvement in an ethylene absorption efficiency. A stirring blade diameter "d" is more preferably 0.75 m or more. A stirring blade diameter "d" is more preferably 4 m or less. A stirring blade diameter "d" is twice a distance from a rotation axis to the top of the blade (the farthest point from the rotation axis.

There are no particular restrictions to a width "b" (length in the height direction) of a wide paddle blade (paddle) which can be adjusted by a volume of a polymerization tank 1 or the like, and it is preferably 1 to 10 m in the light of improvement in an ethylene absorption efficiency. A width "b" is more preferably 1.5 m or more. A width "b" is more preferably 8 m or less.

There are no particular restrictions to a ratio of a width (paddle width) "b" to a stirring blade diameter "d" (b/d) in a wide paddle blade which can be determined depending on a shape of a polymerization tank 1 or the like, and it is preferably 1 or more. The ratio (b/d) is more preferably 1.5 or more. The ratio (b/d) is generally 2.5 or less.

A shape of a polymerization tank 1 is generally, but not limited to, almost columnar. In such a case, a wide paddle blade is placed in an almost columnar polymerization tank 1 such that a rotation axis of the polymerization tank 1 is aligned with a rotation axis of the wide paddle blade. There are no particular restrictions to a ratio of a stirring blade diameter "d" (m) to an inner diameter of the polymerization tank "D" (m) (d/D) as long as the effects of the present invention are not impaired. The ratio can be appropriately adjusted depending on a polymerization tank used, and generally 0.4 to 0.9. A volume of the polymerization tank is generally, but not limited to, 1 to 200 kL.

There are no particular restrictions to a rotation number "n" of the stirring blade which can be adjusted such that a stirring power Pv and Froude number Fr are within the above ranges, and it is preferably 0.5 to 1.35 rps. If a rotation number "n" is less than 0.5 rps, a polymerization solution tends to be supercooled near a heat transfer surface, so that a gelatinous material may be formed on the inner wall of the polymerization tank, leading to difficulty in prolonged operation. If a rotation number "n" is more than 1.35 rps, with a low-viscosity polymerization solution, the solution may splash and adhere to the inner wall of the gas-phase part in the polymerization tank. If such a deposit is solidified and mixed into the polymerization solution, it may lead to formation of foreign matter by which operation may be unstable.

Conventionally, in production of an ethylene-vinyl alcohol copolymer, a stirring power per unit volume which is an indicator of agitation strength is controlled. A stirring power is, however, influenced by various factors such as a volume, a viscosity and a density of a reaction liquid, a shape of a polymerization tank, as well as a shape and a rotation number of the stirring blade. Therefore, controlling a stirring power is insufficient for high level control of blocking property of ethylene units, resultantly leading to extension of an ethylene chain (blocking of ethylene units), and a block character of ethylene units in an ethylene-vinyl alcohol copolymer obtained is less than 0.90. Furthermore, extension of an ethylene chain results in stronger intermolecular hydrophobic interaction, and thus oxygen-gas barrier performance of a multilayer structure obtained is insufficient. To solve the problem, the inventors have found, as a result of intense investigation, that a copolymer having a shorter ethylene chain (ethylene units are positioned at random) as compared with conventional technique can be obtained by proceeding a polymerization reaction under particular conditions, and have achieved improvement in oxygen-gas barrier performance of a multilayer structure obtained.

In the light of further high level control of a block character of ethylene units, in the above production method, it is preferable that the polymerization tank is connected to a heat exchanger via a pipe, and the method further comprises, in production of the ethylene-vinyl ester copolymer, (b) the step of introducing an ethylene-containing gas present in a gas-phase part in the polymerization tank, into the heat exchanger; (c) the step of feeding a vinyl ester to the heat exchanger; (d) the step of contacting the vinyl ester with the ethylene-containing gas in the heat exchanger; and (e) the step of discharging the vinyl ester in which ethylene is dissolved, from the heat exchanger and introducing the vinyl ester into the polymerization tank. A vinyl ester can be directly, that is, not via a heat exchanger, fed to a polymerization tank. However, as described herein, by a procedure where ethylene is first absorbed by a vinyl ester in a heat exchanger and then fed to a polymerization tank, ethylene can be efficiently absorbed by the vinyl ester, so that a block character of ethylene units can be highly controlled. Although a part of a vinyl ester fed to a polymerization tank can be contacted with an ethylene-containing gas in a heat exchanger, it is preferable that the whole vinyl ester fed is contacted with an ethylene-containing gas in a heat exchanger.

There are no particular restrictions to a heat exchanger used, and a heat exchanger with a larger surface area is preferable in the light of efficient absorption of ethylene. Examples include a vertical wetted-wall heat exchanger, a vertical wetted-wall multitubular heat exchanger, and a heat exchanger in which a packed column type, a porous plate type or a bubble cap type absorber is equipped with a jacket and/or a coil. Among these, a vertical wetted-wall multitubular heat exchanger is more preferable.

In the apparatus shown in FIG. 1, a heat exchanger 2 is a vertical wetted-wall multitubular heat exchanger. To the heat exchanger 2 is connected a vinyl ester inlet pipe 10, through which a vinyl ester is fed to the upper part of the heat exchanger 2. The starting vinyl ester can be a vinyl ester alone or a mixed solution of the organic solvent and a vinyl ester, and the latter is preferable.

To the heat exchanger 2 shown in FIG. 1 are connected refrigerant pipes 11, 12. The positions of the pipes are not limited to those shown in the figure, and it is preferable that a refrigerant is fed from the refrigerant pipe 12 connected to the lower part of the heat exchanger 2 while being discharged from the refrigerant pipe 11 connected to the upper part of the heat exchanger 2. With such connections, the vinyl ester can be efficiently cooled, resulting in higher ethylene-absorption efficiency. Examples of a refrigerant include, but not limited to, an aqueous solution of an alcohol such as methanol, ethanol, ethylene glycol and glycerol; an aqueous solution of sodium chloride and calcium chloride; and Freons. In the light of handleability and cost, an aqueous solution of an alcohol, particularly an aqueous solution of methanol can be suitably used.

A gas discharge pipe 13 for discharging gases from the heat exchanger 2 is connected to the upper part of the heat exchanger 2. A mist separator (not shown) can be connected to the gas discharge pipe 13. Droplets in the discharged gas are removed by a mist separator, and mist-free ethylene can be collected or expelled. A mist separator is an apparatus for separating droplets suspended in a gas utilizing external force such as gravity, centrifugal force or electrostatic force, or shielding or sieving effect. Examples of a mist separator include a gravity settler, a cyclone, an electric dust collector, a scrubber, a bag filter and a packed bed. Among these, a cyclone is preferable.

There are no particular restrictions to a method for contacting a vinyl ester with an ethylene-containing gas in the heat exchanger 2. For example, a vinyl ester flows down from the upper part of the heat exchanger 2 while a pressurized ethylene-containing gas is fed to the lower part of the heat exchanger, so that these are brought into countercurrent contact in the heat exchanger 2; or alternatively, a vinyl ester flows down from the upper part of the heat exchanger 2 while a pressurized ethylene-containing gas is fed to the upper part of the heat exchanger, so that these are brought into co-current contact in the heat exchanger 2. In the light of efficient ethylene absorption, the former is preferable.

In the apparatus shown in FIG. 1, a polymerization tank 1 is connected to a heat exchanger 2 via two pipes 3,4. An ethylene-containing gas is introduced from the polymerization tank 1 through the pipe 3 to the lower part of the heat exchanger 2, and the vinyl ester having absorbed ethylene is introduced from the lower part of the heat exchanger 2 through the pipe 4 to the polymerization tank 1.

The vinyl ester is fed through an inlet pipe 10 to the heat exchanger 2. The vinyl ester introduced into the upper part of the heat exchanger 2 absorbs ethylene while passing through the heat exchanger 2.

The ethylene-containing gas is introduced through the pipe 3 connected to the lower part of the heat exchanger 2 into the heat exchanger 2. The pipe 3 on the heat exchanger side is connected to the lower part of the heat exchanger 2, while the vinyl ester inlet pipe 10 is connected to the upper part of the heat exchanger 2. The ethylene-containing gas flows up in the heat exchanger 2 while being brought into countercurrent contact with the vinyl ester. As a result, ethylene in the gas is dissolved in the vinyl ester.

The vinyl ester having absorbed ethylene is introduced through the pipe 4 into the polymerization tank 1. For continuous production, ethylene is circulated in the polymerization tank 1, the heat exchanger 2 and pipes 3, 4. Some of ethylene is contained in the vinyl ester, which is discharged from the reaction liquid outlet pipe 9. Therefore, ethylene is replenished via at least one of pipes 5, 6, 7 from an ethylene supply source connected to the polymerization tank 1.

(Saponification Step)

An ethylene-vinyl alcohol copolymer is produced by saponifying the ethylene-vinyl ester copolymer obtained in the polymerization step. Here, it is preferable to saponify the ethylene-vinyl ester copolymer by alcoholysis or hydrolysis in the presence of a catalyst in an organic solvent. Examples of a catalyst used in the saponification step include basic catalysts such as sodium hydroxide, potassium hydroxide and sodium methoxide; and acidic catalysts such as sulfuric acid, hydrochloric acid and p-toluenesulfonic acid. Examples of an organic solvent used in the saponification step include, but not limited to, alcohols such as methanol and ethanol; esters such as methyl acetate and ethyl acetate; ketones such as acetone and methyl ethyl ketone; and aromatic hydrocarbons such as benzene and toluene. These can be used alone or in combination of two or more. Among these, it is convenient and preferable that saponification reaction is conducted in the presence of sodium hydroxide as a basic catalyst using methanol or a mixed solution of methanol and methyl acetate as a solvent. The amount of the saponification catalyst is preferably 0.001 to 0.5 as a molar ratio to vinyl ester units in the ethylene-vinyl ester copolymer. The molar ratio is more suitably 0.002 or more. The molar ratio is more suitably 0.4 or less, further suitably 0.3 or less.

After the saponification step, a pulverization step and a drying step can be conducted. The pulverization step can be divided into a pre-pulverization step and a main pulverization step. After the saponification step, if necessary, a washing step can be further conducted for removing impurities such as sodium acetate.

(Compound Having a Conjugated Double Bond)

In the light of oxygen-gas barrier performance, a layer (A) is preferably composed of the ethylene-vinyl alcohol copolymer composition comprising an ethylene-vinyl alcohol copolymer and a compound having a conjugated double bond with a molecular weight of 1000 or less, wherein a content of the compound is 0.000001 to 0.01 parts by mass based on 100 parts by mass of the ethylene-vinyl alcohol copolymer. Although a mechanism of improvement in oxygen-gas barrier performance is not clearly understood, it can be assumed that a conjugated double bond moiety moderately interacts with an ethylene unit in an ethylene-vinyl alcohol copolymer.

In the present invention, a compound having a conjugated double bond with a molecular weight of 1000 or less is a compound having a conjugated double bond of aliphatic double bonds, or a compound having a conjugated double bond of an aliphatic double bond and an aromatic ring. In the light of more effective improvement in oxygen-gas barrier performance, the former is preferable. The molecular weight is 1000 or less, preferably 800 or less, more preferably 500 or less.

A compound having a conjugated double bond of aliphatic double bonds is a compound having a conjugated double bond having a structure where carbon-carbon double bonds and carbon-carbon single bonds are alternately connected, wherein two or more carbon-carbon double bonds are present. Specific examples include a conjugated diene compound having a conjugated structure where two carbon-carbon double bonds and one carbon-carbon single bond are alternately connected; a conjugated triene compound having a conjugated structure where three carbon-carbon double bonds and two carbon-carbon single bonds are alternately connected (for example, 2,4,6-octatriene), and a conjugated polyene compound having a conjugated structure where a more number of carbon-carbon double bonds and carbon-carbon single bonds are alternately connected. Particularly, in the light of higher improving effect of oxygen-gas barrier performance, a conjugated diene compound is preferable. A compound having a conjugated double bond with a molecular weight of 1000 or less used in the present invention can have independently of each other a plurality of conjugated double bonds in one molecule; for example, a compound having three conjugated trienes in the same molecule such as wood oil can be included.

A compound having a conjugated double bond with a molecular weight of 1000 or less can have another functional group other than a conjugated double bond. Examples of the other functional group include a carboxy group and salts thereof, a hydroxy group, an ester group, a carbonyl group, an ether group, an amino group, a dialkylamino group, an imino group, an amide group, a cyano group, a diazo group, a nitro group, a mercapto group, a sulfone group, a sulfoxide group, a sulfide group, a thiol group, a sulfonic acid group and salts thereof, a phosphoric acid group and salts thereof, a polar group such as a halogen atom, and a nonpolar group such as a phenyl group. In the light of more effective improvement in oxygen-gas barrier performance, the other functional group is preferably a polar group, more preferably a carboxy group and salts thereof, and a hydroxy group. The other functional group can be directly bonded to a carbon atom in a conjugated double bond, or bonded at a position apart from a conjugated double bond. A multiple bond in the other functional group can be at such a position that it can be conjugated with the conjugated double bond; for example, 1-phenyl-1,3-butadiene having a phenyl group or sorbic acid having a carboxy group can be used as the compound having a conjugated double bond. The compound having a conjugated double bond with a molecular weight of 1000 or less can have an unconjugated double bond or an unconjugated triple bond.

Specific examples of the compound having a conjugated double bond with a molecular weight of 1000 or less include a compound having a conjugated double bond of aliphatic double bonds such as 2,3-dimethyl-1,3-butadiene, 4-methyl-1,3-pentadiene, 1-phenyl-1,3-butadiene, sorbic acid and myrcene; and a compound having a conjugated double bond of an aliphatic double bond and an aromatic ring such as 2,4-diphenyl-4-methyl-1-pentene, α-methylstyrene polymer and 1,3-diphenyl-1-butene.

A content of a compound having a conjugated double bond with a molecular weight of 1000 or less in the ethylene-vinyl alcohol copolymer composition is preferably 0.000001 to 0.01 parts by mass based on 100 parts by mass of the ethylene-vinyl alcohol copolymer. The content is more suitably 0.000002 parts by mass or more, further suitably 0.000003 parts by mass or more. The content is more suitably 0.0075 parts by mass or less, further suitably 0.005 parts by mass or less, particularly suitably 0.0025 parts by mass or less.

In the present invention, there are no particular restrictions to a method for adding a compound having a conjugated double bond with a molecular weight of 1000 or less. Examples include 1) a method where the compound is added to an ethylene-vinyl ester copolymer obtained followed by saponification; 2) a method where an ethylene-vinyl ester copolymer is saponified while the compound is added; 3) a method where a solution containing the compound is sprayed over an ethylene-vinyl alcohol copolymer; 4) a method where an ethylene-vinyl alcohol copolymer is immersed in a solution containing the compound followed by drying; 5) a method where an aqueous solution containing an ethylene-vinyl alcohol copolymer and the compound is prepared and then dried; and 6) a method where an aqueous solution containing an ethylene-vinyl alcohol copolymer and the compound is prepared and mixed. Among these, the method 6) is preferable in the light of convenience in adjusting a content of the compound.

A content of the ethylene-vinyl alcohol copolymer in the ethylene-vinyl alcohol copolymer composition is suitably 50% by mass or more, more suitably 80% by mass or more, further suitably 95% by mass or more. Furthermore, in the ethylene-vinyl alcohol copolymer composition, a mass ratio of the ethylene-vinyl alcohol copolymer to the total polymer components (ethylene-vinyl alcohol copolymer/total polymer components) is preferably 0.9 or more. Furthermore, it is more preferable that a polymer component contained in the ethylene-vinyl alcohol copolymer composition is substantially comprised of the ethylene-vinyl alcohol copolymer alone.

[Layer (B)]

A layer (B) contains at least one resin selected from the group consisting of a polyolefin resin, a polyester resin, and a polyamide resin. A thickness of the layer (B) (a final thickness when stretching is conducted) is preferably 5 to 100 μm.

Examples of a polyolefin resin include a polyethylene [high-density polyethylene (HDPE), low-density polyethylene (LDPE), linear low-density polyethylene (LLDPE), very low-density polyethylene (VLDPE) and the like], a polypropylene, a copolymerized polypropylene, an ethylene-vinyl acetate copolymer, and an ethylene-(meth)acrylate copolymer. Among these, polyethylene and polypropylene are preferable.

Examples of a polyester resin include a polyethylene terephthalate (hereinafter, sometimes abbreviated as "PET"), a polyethylene naphthalate, a polybutylene terephthalate, and a polyethylene terephthalate/isophthalate. Among these, a polyethylene terephthalate (PET) is preferable.

Examples of a polyamide resin include homopolymers such as polycaproamide (Nylon-6), polyundecanamide (Nylon-11), polylauryllactam (Nylon-12), poly(hexamethylene adipamide) (Nylon-6,6), and polyhexamethylene sebacamide (Nylon-6,12), and copolymers such as a caprolactam/lauryllactam copolymer (Nylon-6/12), a caprolactam/aminoundecanoic acid polymer (Nylon-6/11), a caprolactam/w-aminononanoic acid polymer (Nylon-6,9), caprolactam/hexamethylenediammonium adipate copolymer (Nylon-6/6, 6), a caprolactam/hexamethylenediammonium adipate/hexamethylenediammonium sebacate copolymer (Nylon-6/6,6/6,12), a polymer of adipic acid and meta-xylylenediamine, and an aromatic Nylon which is a polymer of hexamethylenediamine and m,p-phthalic acid. Among these, polycaproamide (Nylon-6) and poly(hexamethylene adipamide) (Nylon-6,6) are preferable.

(Multilayer Structure)

A multilayer structure of the present invention has a layer (A) and a layer (B). An oxygen transmission amount of the multilayer structure is suitably 150 cc/m$^2$·day·atm or less, more suitably 100 cc/m$^2$·day·atm or less, further suitably 50 cc/m$^2$·day·atm or less. In the present invention, an oxygen transmission amount of a multilayer structure is determined as described in Examples.

To improve gas barrier performance, strength and handleability, each layer of a multilayer structure of the present invention can contain an inorganic layered compound. Examples of an inorganic layered compound include micas, talc, montmorillonite, kaolinite and vermiculite, which can be naturally occurring or synthetic.

To improve water resistance, each layer of a multilayer structure of the present invention can contain a cross-linking agent. Examples of a cross-linking agent include an epoxy compound, an isocyanate compound, an aldehyde compound, a titanium compound, a silica compound, an aluminum compound, a zirconium compound, and a boron compound. Among these, a silica compound such as colloidal silica and an alkyl silicate is preferable.

There are no particular restrictions to a method for producing a multilayer structure of the present invention, and preferred is a method comprising a step of preparing an aqueous solution containing the ethylene-vinyl alcohol copolymer to give a coating agent, and a step of applying the coating agent to a surface of a substrate made of at least one selected from the group consisting of a polyolefin resin, a polyester resin and a polyamide resin.

Examples of the substrate include a polyolefin resin film, a polyester resin film and a polyamide resin film. The substrate is to be a layer (B).

A content of the ethylene-vinyl alcohol copolymer in the aqueous solution is preferably, but not limited to, 5 to 50% by mass. If the concentration is less than 5% by mass, drying load increases, while if it is more than 50% by mass, viscosity of the aqueous solution increases, leading to deterioration in coatability. A coating agent which is the aqueous solution is applied to the surface of the substrate, followed by drying to form a layer (A). Here, an evaporation rate is suitably 2 to 2000 g/m$^2$·min, more suitably 50 to 500 g/m$^2$·min.

In a production method of the present invention, the coating agent is applied to the surface of substrate preferably within 30 days, more preferably within 20 days, further preferably within 10 days, particularly preferably within 7 days after preparation thereof. An aqueous solution containing the ethylene-vinyl alcohol copolymer exhibits excellent viscosity stability even after a long-term storage. Therefore, even after a long period of time from preparation of the aqueous solution, it can be uniformly applied to a substrate and thus, a multilayer structure exhibiting excellent oxygen-gas barrier performance can be provided. In this light, it is preferable that the coating agent is applied to the surface of the substrate one or more days after preparation thereof.

The aqueous solution can contain a surfactant, a leveling agent, and the like. Furthermore, in the light of coatability, the aqueous solution can contain a lower aliphatic alcohol such as methanol, ethanol, and isopropanol. Here, a content of the lower aliphatic alcohol in the aqueous solution is suitably 100 parts by mass or less, more suitably 50 parts by mass or less, further suitably parts by mass or less, based on 100 parts by mass of water. In the light of working environment, it is preferable that a liquid medium contained in the aqueous solution is water alone. Furthermore, the aqueous solution can contain an antifungal agent, a preservative, and the like. A temperature during applying the aqueous solution is preferably 20 to 80° C. A suitable applying method is gravure roll coating, reverse gravure coating, reverse roll coating, or wire roll coating. A substrate before applying a coating agent or a multilayer structure obtained can be stretched or heated. Here, in the light of workability, it is preferable that the substrate is subjected to one-step stretch, a coating agent is applied to the substrate, and then the substrate is subjected to two-step stretch, where the substrate is heated during or after the two-step stretch.

The above heating is conducted, for example, in the air. A heating temperature can be controlled, depending on the type of the substrate, and is generally 140° C. to 170° C. for a polyolefin film and 140° C. to 240° C. for a polyester film and a polyamide film. If the layer (A) is heated, the heating is generally conducted together with the layer (B).

A thickness of the layer (A) (a final thickness when stretching is conducted) is suitably 0.1 to 20 μm, more suitably 0.1 to 9 μm.

A thickness ratio (A/B) of the layer (A) to the layer (B) in the multilayer structure is suitably 0.9 or less, more suitably 0.5 or less.

In order to improving adhesiveness, an adhesive component layer can be formed between the layer (A) and the layer (B). The adhesive component can be an anchor coat agent or the like. The adhesive layer can be formed by, for example, applying an adhesive component to the surface of the substrate before applying an aqueous solution of the ethylene-vinyl alcohol copolymer.

In a multilayer structure of the present invention, a heat-seal resin layer can be further formed on the side of the layer (A), which does not face the layer (B). A heat-seal resin layer is generally formed by extrusion lamination or dry lamination. The heat-seal resin can be, for example, a polyethylene resin such as HDPE, LDPE and LLDPE; a polypropylene resin; an ethylene-vinyl acetate copolymer; an ethylene·α-olefin random copolymer; and an ionomer resin.

[Packaging Material]

A packaging material having a multilayer structure of the present invention is also a suitable embodiment of this invention. The packaging material exhibits excellent oxygen-gas barrier performance, owing to the multilayer structure of the present invention.

The packaging material is used for packaging, for example, foods; beverages; agents such as agrochemicals and medicines; medical instruments; industrial materials such as machine parts and precision materials; and clothing. In particular, the packaging material is favorably used for applications requiring barrier property to oxygen, and applications in which the interior of the packaging material is substituted with a variety of functional gases.

Examples of the form of the packaging material include a vertically-manufactured bag filling and sealing bag, a vacuum packaging bag, a pouch with a spout, a laminate tube container, and a lid material for a container.

EXAMPLES

Next, there will be further specifically described the present invention with reference to, but not limited to, Examples. In Examples and Comparative Examples below, "part(s)" and "%" are, unless otherwise indicated, on a mass basis.

Physical property values of an ethylene-vinyl alcohol copolymer produced by the following Examples and Comparative Examples were measured as described below.

[Viscosity-Average Polymerization Degree and Saponification Degree of an Ethylene-Vinyl Alcohol Copolymer]

A viscosity-average polymerization degree and a saponification degree of an ethylene-vinyl alcohol copolymer were determined in accordance with a method described in JIS K6726 (1994).

[Block Character of Ethylene Units of an Ethylene-Vinyl Alcohol Copolymer]

An ethylene-vinyl alcohol copolymer was saponified to a saponification degree of 99.9 mol % or more, thoroughly washed with methanol, and then dried at 90° C. under reduced pressure for 2 days. The resulting copolymer was dissolved in DMSO-$d_6$ and analyzed by 600 MHz $^{13}$C-NMR at 80° C. Using a molar fraction of a vinyl alcohol-ethylene two-unit chain (AE), a molar fraction of vinyl alcohol units (A), and a molar fraction of ethylene units (E) assigned and calculated from the obtained spectrum as described in T. Moritani and H. Iwasaki, 11, 1251-1259, Macromolecules (1978), a block character (η) of ethylene units was determined according to the following equation:

$$\eta=(AE)/\{2\times(A)\times(E)\}$$

A stirring power Pv per unit volume (kW/m³) was calculated from the following equation, wherein Pt is a stirring power (kW) during polymerization; Pe is a stirring power (kW) under no load (a polymerization tank is empty); and V is the amount of a polymerization solution in a polymerization reactor (m³).

$$Pv=(Pt-Pe)/V$$

Pe and Pt in the above equation were calculated from a current (A) and a voltage (V) of a stirrer according to the following equation, respectively.

$$Pe(\text{or } Pt)=3^{1/2}\times\text{Voltage}\times\text{Current}\times\text{Power factor}\times\text{Efficiency}/1000$$

[Oxygen-Gas Barrier Performance]

Multilayer structures obtained in Examples and Comparative Examples were moisture-conditioned at a temperature of 20° C. and 85% RH for 5 days, and then an oxygen transmission amount (cc/m²·day·atm) was measured using an oxygen transmission amount measuring apparatus (Modern Control Inc., MOCON OX-TRAN2/21).

Example 1

(Production of Copolymer 1)

FIG. 1 schematically shows a polymerization apparatus used. To a generally cylindrical polymerization tank 1 [volume: 7 kL, tank inner diameter D: 1.8 m] equipped with Fullzone blade [from Kobelco Eco-Solutions Co., Ltd., stirring blade diameter (diameter) d: 1.1 m, blade (paddle) width b: 1.5 m] as a stirring blade 8 were fed ethylene at such a rate that an inner ethylene pressure was 0.23 MPa, and a 1% by mass solution of 2,2'-azobis-(4-methoxy-2,4-dimethylvaleronitrile) as a polymerization initiator in methanol at a rate of 3 L/hr from pipe 5 and pipe 6, respectively. Furthermore, via an inlet pipe 10 and a heat exchanger 2, a solution containing vinyl acetate (vinyl acetate: 777 L/hr, methanol: 170 L/hr) was introduced into the polymerization tank 1. An ethylene-containing gas was introduced from polymerization tank 1 through pipe 3 into a heat exchanger 2. While flowing down along the pipe, the solution containing vinyl acetate absorbs ethylene, and poured into polymerization tank 1 via pipe 4, to be mixed with a reaction liquid and subjected to continuous polymerization with ethylene. The polymerization solution was continuously removed through pipe 9 at such a rate that the solution level in polymerization tank 1 was kept constant. Furthermore, the conditions were regulated so that a polymerization ratio of vinyl acetate at the outlet of polymerization tank 1 was 30%. Furthermore, the conditions were regulated so that a stirring power per unit volume Pv was 3.1 kW/m³ and Froude number Fr was 0.15. While the reaction liquid was stirred, the whole blade (paddle) was immersed in the reaction liquid and the solution level was close to the upper end of the blade (paddle). A residence time of the reaction liquid in the polymerization tank was 5 hours. A temperature of the outlet of the polymerization tank was 60° C. Methanol vapor was introduced into the continuously removed polymerization solution to remove the unreacted vinyl acetate monomer, giving a solution of an ethylene-vinyl acetate copolymer in methanol (concentration: 32%).

To a solution of an ethylene-vinyl acetate copolymer in methanol (concentration: 32% by mass) obtained in the above polymerization step was added a solution of sodium hydroxide as a saponification catalyst in methanol (concentration: 4% by mass) such that a molar ratio of sodium hydroxide to vinyl acetate units in the ethylene-vinyl acetate copolymer was 0.012. The ethylene-vinyl acetate copolymer solution and the saponification catalyst solution were mixed by a static mixer, and then the resulting mixture was placed on a belt while being retained at 40° C. for 18 min to proceed saponification reaction. Subsequently, pulverization and drying were conducted to give an ethylene-vinyl alcohol copolymer. The copolymer thus obtained had an ethylene unit content of 2 mol %, a viscosity-average polymerization degree of 1700, a saponification degree of 98.5 mol %, and a block character of ethylene units of 0.95.

(Production of a Multilayer Structure)

To water were added 100 parts by mass of the ethylene-vinyl alcohol copolymer obtained and 0.004 parts by mass of 2,4-diphenyl-4-methyl-1-pentene (DPMP) as a compound having a conjugated double bond with a molecular weight of 1000 or less, to prepare a 7% by mass aqueous solution of the ethylene-vinyl alcohol copolymer (coating agent), which was then allowed to stand at 20° C. and 60% RH for one hour. An anchor coat agent (adhesive) was applied to a layer (B) of a stretched polyethylene terephthalate (OPET) film (substrate) with a thickness of 15 µm, to form an adhesive layer on the surface of the OPET film. Using a gravure coater, the coating agent obtained above was applied to the surface of the adhesive layer at 40° C., which was then dried at 120° C. to form a layer (A). For promoting the reaction of the anchor coat agent, the film was further heat-treated at 160° C. for 120 sec, to give a multilayer structure. A thickness of the layer (A) was 2 µm. An oxygen transmission amount X of the multilayer structure obtained is shown in Table 2. Furthermore, a multilayer structure was produced as described above, except that a coating agent prepared was allowed to stand for 5 days, and then an oxygen transmission amount Y was measured. The results are shown in Table 2.

Examples 2 to 6, and 8 to 9, and Comparative Example 2, 3 and 5

(Production of an Ethylene-Vinyl Acetate Copolymer)

An ethylene-vinyl alcohol copolymer was produced as described in Example 1, except that feed rates of ethylene, vinyl acetate, methanol and an initiator, a polymerization ratio, a stirring power Pv, a Froude number Fr in polymerization, as well as a concentration of the ethylene-vinyl ester copolymer solution and a molar ratio of sodium hydroxide in saponification were changed as shown in Table 1, and a stirring blade 8 was a Maxblend blade [Sumitomo Heavy Industries Process Equipment Co., Ltd., stirring blade diameter (diameter) d: 1 m, blade (paddle) width b: 2 m].

(Production of a Multilayer Structure)

A multilayer structure was produced as described in Example 1, except that the types of an ethylene-vinyl alcohol copolymer, a compound having a conjugated double bond with a molecular weight of 1000 or less and a substrate, a heating temperature and the like were changed, and an oxygen transmission amount was measured. The results are shown in Table 2.

When a Froude number Fr is too low (Comparative Example 2, Fr was 0.02), an ethylene-vinyl alcohol copolymer with a higher blocking property of ethylene units, in which a block character of the ethylene units was 0.88, was obtained. The ethylene-vinyl alcohol copolymer obtained was used to prepare a coating agent, which was, after 5 days, used to produce a multilayer structure, whose oxygen-gas barrier performance was insufficient. When a Froude number Fr is too high (Comparative Example 3, Fr was 0.21), an ethylene-vinyl alcohol copolymer with a very high randomness of ethylene units, in which a block character of the ethylene units was 1.01, was obtained. A multilayer structure obtained using the ethylene-vinyl alcohol copolymer had insufficient oxygen-gas barrier performance, irrespective of a time of standing the coating agent. When a saponification degree is too high (Comparative Example 5, a saponification degree was 99.9 mol %), a coating agent standing five days after preparation gelated, and thus a multilayer structure could not be produced or evaluated.

Example 7

(Production of an Ethylene-Vinyl Acetate Copolymer)

To polymerization tank 1 equipped with Maxblend blade [Sumitomo Heavy Industries Process Equipment Co., Ltd., stirring blade diameter (diameter) d: 1 m, blade (paddle) width b: 2 m] as a stirring blade 8 were fed ethylene at such a rate that an inner ethylene pressure was 0.27 MPa, and a 1% by mass solution of 2,2'-azobis-(4-methoxy-2,4-dimethylvaleronitrile) as a polymerization initiator in methanol at a rate of 1.8 L/hr from pipe 5 and pipe 6, respectively. Furthermore, through an inlet pipe 7, a solution containing vinyl acetate (vinyl acetate: 906 L/hr, methanol: 42 L/hr) was introduced into polymerization tank 1. The polymerization solution was continuously removed through pipe 9 at such a rate that the solution level in polymerization tank 1 was kept constant. Furthermore, the conditions were regulated so that a polymerization ratio at the outlet of polymerization tank 1 was 24%. Furthermore, the conditions were regulated so that a stirring power Pv was 4 kW/m$^3$ and Froude number Fr was 0.16. A residence time of the reaction liquid in the polymerization tank was 5 hours. A temperature of the outlet of the polymerization tank was 60° C. Methanol vapor was introduced into the continuously removed polymerization solution to remove the unreacted vinyl acetate monomer, giving a solution of an ethylene-vinyl acetate copolymer in methanol (concentration: 25%).

To a solution of an ethylene-vinyl ester copolymer in methanol (concentration: 25% by mass) obtained in the above polymerization step was added a solution of sodium hydroxide as a saponification catalyst in methanol (concentration: 4% by mass) such that a molar ratio of sodium hydroxide to vinyl acetate units in the ethylene-vinyl acetate copolymer was 0.022. The ethylene-vinyl ester copolymer solution and the saponification catalyst solution were mixed by a static mixer, and then the resulting mixture was placed on a belt while being retained at 40° C. for 18 min to proceed a saponification reaction. Subsequently, pulverization and drying were conducted to give an ethylene-vinyl alcohol copolymer. The copolymer thus obtained had an ethylene unit content of 2 mol %, a viscosity-average polymerization degree of 2800, a saponification degree of 99.5 mol %, and a block character of ethylene units of 0.93.

(Production of a Multilayer Structure)

A multilayer structure was produced as described in Example 1, except that an ethylene-vinyl alcohol copolymer and a compound having a conjugated double bond with a molecular weight of 1000 or less were changed, and an oxygen transmission amount at 20° C. and 85% RH was measured. The results are shown in Table 2.

Comparative Example 1

Various ethylene-vinyl alcohol copolymers were produced as described in Example 7, except that feed rates of ethylene, vinyl acetate, methanol and an initiator, a polymerization ratio, a stirring power per unit volume Pv, a Froude number Fr in polymerization, as well as a concentration of the ethylene-vinyl ester copolymer solution and a molar ratio of sodium hydroxide in saponification were changed as shown in Table 1, and a stirring blade 8 was a two-stage inclined paddle blade [stirring blade diameter (diameter) d: 1.5 m, blade (paddle) width b: 0.88 m]. Here, the two-stage inclined paddle blade does not correspond to a wide paddle blade because its blade (paddle) width b is small.

(Production of a Multilayer Structure)

A multilayer structure was produced as described in Example 1, except that an ethylene-vinyl alcohol copolymer and a compound having a conjugated double bond with a molecular weight of 1000 or less were changed, and an oxygen transmission amount was measured. The results are shown in Table 2.

In Comparative Example 1, an ethylene-vinyl alcohol copolymer with higher blocking property of ethylene units in which a block character of ethylene units was 0.85 was obtained, substituting a two-stage inclined paddle blade for a wide paddle blade. The ethylene-vinyl alcohol copolymer obtained was used to prepare a coating agent, which was, after 5 days, used to produce a multilayer structure, whose oxygen-gas barrier performance was insufficient.

Comparative Example 4

Various ethylene-vinyl alcohol copolymers were produced as described in Example 1, except that feed rates of ethylene, vinyl acetate, methanol and an initiator, a polymerization ratio, a stirring power per unit volume Pv, a Froude number Fr in polymerization, as well as a concentration of the ethylene-vinyl ester copolymer solution and a molar ratio of sodium hydroxide in saponification were changed as shown in Table 1, and a stirring blade 8 was an anchor blade [stirring blade diameter (diameter) d: 1.7 m, blade (paddle) width b: 0.85 m]. Here, the anchor blade does not correspond to a wide paddle blade because its blade (paddle) width b is small.

(Production of a Multilayer Structure)

Due to an excessive amount of ethylene units (22 mol %), ethylene-vinyl alcohol copolymer was insoluble in water. Therefore, a multilayer structure could not be produced or evaluated.

|  | Polymerization conditions | | | | | | | | Saponification conditions | |
|---|---|---|---|---|---|---|---|---|---|---|
|  | Ethylene Mpa | Vinyl acetate L/hr | Methanol L/hr | Initiator L/hr | Polymerization ratio % | Stirring blade | Stirring power Pv kW/m$^3$ | Froude number Fr | Supply of vinyl acetate | PvAc concentration % by mass | NaOH Molar ratio |
| Example 1 | 0.23 | 777 | 170 | 3 | 30 | Fullzone blade | 3.1 | 0.15 | Heat exchanger | 32 | 0.012 |
| Example 2 | 0.23 | 777 | 170 | 3 | 30 | Maxblend blade | 2.2 | 0.13 | Heat exchanger | 32 | 0.01 |
| Example 3 | 0.26 | 873 | 75 | 2 | 26 | Maxblend blade | 3.3 | 0.09 | Heat exchanger | 25 | 0.02 |
| Example 4 | 0.47 | 820 | 128 | 2.5 | 28 | Maxblend blade | 3 | 0.11 | Heat exchanger | 30 | 0.012 |
| Example 5 | 0.61 | 751 | 190 | 9 | 43 | Maxblend blade | 3 | 0.1 | Heat exchanger | 40 | 0.02 |
| Example 6 | 0.69 | 682 | 185 | 82.6 | 70 | Maxblend blade | 1.9 | 0.1 | Heat exchanger | 45 | 0.015 |
| Example 7 | 0.27 | 906 | 42 | 1.8 | 24 | Maxblend blade | 4 | 0.16 | Direct | 25 | 0.022 |
| Example 8 | 0.61 | 751 | 190 | 9 | 43 | Maxblend blade | 3 | 0.1 | Heat exchanger | 40 | 0.02 |
| Example 9 | 0.61 | 751 | 190 | 9 | 43 | Maxblend blade | 3 | 0.1 | Heat exchanger | 40 | 0.02 |
| Comparative Example 1 | 0.61 | 751 | 190 | 9 | 43 | Two-stage inclined paddle blade | 2 | 0.18 | Direct | 40 | 0.02 |
| Comparative Example 2 | 0.61 | 751 | 190 | 9 | 43 | Maxblend blade | 0.8 | 0.02 | Heat exchanger | 40 | 0.02 |
| Comparative Example 3 | 0.1 | 745 | 2 | 202.7 | 78 | Maxblend blade | 6.9 | 0.21 | Heat exchanger | 45 | 0.008 |
| Comparative Example 4 | 1.77 | 735 | 174 | 41 | 50 | Anchor blade | 1.8 | 0.17 | Heat exchanger | 40 | 0.03 |
| Comparative Example 5 | 0.69 | 682 | 185 | 82.6 | 70 | Maxblend blade | 1.9 | 0.1 | Heat exchanger | 45 | 0.03 |

|  | Layer (A) | | | | | | | Multilayer structure | | | |
|---|---|---|---|---|---|---|---|---|---|---|---|
|  | Ethylene-vinyl alcohol copolymer | | | | Compound having a conjugated double bond | | |  | Oxygen transmission amount X[5] (cc/m$^2 \cdot$ day $\cdot$ atm) | Oxygen transmission amount Y[6] (cc/m$^2 \cdot$ day $\cdot$ atm) | Oxygen transmission amount Y/ Oxygen transmission amount X |
|  | Ethylene unit (mol %) | Polymerization degree | Saponification degree (mol %) | Block character | Type[2] | Content[3] (parts by mass) | Layer (B) Type[4] | Heating temperature (° C.) | | | |
| Example 1 | 2 | 1700 | 98.5 | 0.95 | DPMP | 40 × 10$^{-4}$ | OPET | 160 | 94 | 95 | 1.01 |
| Example 2 | 2 | 1700 | 93 | 0.95 | SA | 1.8 × 10$^{-4}$ | OPET | 180 | 98 | 98 | 1.00 |
| Example 3 | 2 | 2300 | 99.3 | 0.96 | SA | 1.8 × 10$^{-4}$ | OPP | 160 | 74 | 76 | 1.03 |

-continued

| | Layer (A) | | | | | | | Multilayer structure | | |
|---|---|---|---|---|---|---|---|---|---|---|
| | Ethylene-vinyl alcohol copolymer | | | | Compound having a conjugated double bond | | | Oxygen transmission amount $X^{5)}$ (cc/m²·day·atm) | Oxygen transmission amount $Y^{6)}$ (cc/m²·day·atm) | Oxygen transmission amount Y/ Oxygen transmission amount X |
| | Ethylene unit (mol %) | Polymer-ization degree | Saponi-fication degree (mol %) | Block character | Type$^{2)}$ | Content$^{3)}$ (parts by mass) | Layer (B) Type$^{4)}$ | Heating temper-ature (° C.) | | |
| Example 4 | 4 | 1700 | 98.5 | 0.97 | SA | $1.8 \times 10^{-4}$ | OPE | 160 | 69 | 71 | 1.03 |
| Example 5 | 6 | 1000 | 99.2 | 0.98 | SA | $1.8 \times 10^{-4}$ | OPET | 160 | 38 | 39 | 1.03 |
| Example 6 | 10 | 400 | 98 | 0.98 | SA | $0.04 \times 10^{-4}$ | OPET | 160 | 39 | 42 | 1.08 |
| Example 7 | 2 | 2800 | 99.5 | 0.93 | SA | $1.8 \times 10^{-4}$ | OPET | 160 | 75 | 78 | 1.04 |
| Example 8 | 6 | 1000 | 99.2 | 0.98 | — | — | OPET | 160 | 56 | 61 | 1.09 |
| Example 9 | 6 | 1000 | 99.2 | 0.98 | DPMP | $110 \times 10^{-4}$ | OPET | 160 | 45 | 49 | 1.09 |
| Comparative Example 1 | 6 | 1000 | 99.2 | 0.85 | SA | $1.8 \times 10^{-4}$ | OPET | 160 | 74 | 161 | 2.18 |
| Comparative Example 2 | 6 | 1000 | 99.2 | 0.88 | SA | $1.8 \times 10^{-4}$ | OPET | 160 | 7 | 146 | 20.86 |
| Comparative Example 3 | 2 | 500 | 88 | 1.01 | SA | $1.8 \times 10^{-4}$ | OPET | 180 | 254 | 264 | 1.04 |
| Comparative Example 4$^{1)}$ | 22 | — | — | 0.99 | — | — | — | — | — | — | — |
| Comparative Example 5 | 10 | 400 | 99.9 | 0.98 | SA | $0.04 \times 10^{-4}$ | OPET | 160 | 45 | — | — |

$^{1)}$The ethylene-vinyl alcohol copolymer obtained was insoluble in water.
$^{2)}$DPMP: 2,4-diphenyl-4-methyl-1-pentene, SA: sorbic acid
$^{3)}$A content of the compound having a conjugated double bond based on 100 parts by mass of an ethylene-vinyl alcohol copolymer
$^{4)}$OPET: Oriented PET film, OPP: Oriented PP film, OPE: Oriented PE film
$^{5)}$Laminate produced using an aqueous solution of the ethylene-vinyl alcohol copolymer obtained, which was allowed to stand at 20° C. and 60% RH for one hour
$^{6)}$Laminate produced using an aqueous solution of the ethylene-vinyl alcohol copolymer obtained, which was allowed to stand at 20° C. and 60% RH for 5 days As shown in Examples, a multilayer structure of the present invention produced using an ethylene-vinyl alcohol copolymer in which a block character of ethylene units was within a predetermined range exhibited excellent oxygen-gas barrier performance. In addition, an aqueous solution containing the ethylene-vinyl alcohol copolymer exhibits excellent viscosity stability even after long-term storage. Therefore, even after a long period of time from preparation of the aqueous solution, it can be uniformly applied to a substrate and thus, a multilayer structure having excellent oxygen-gas barrier performance can be provided.

DESCRIPTIONS OF SYMBOLS

1: Polymerization tank
2: Heat exchanger
3 to 7: Pipes
8: Stirrer
9: Reaction liquid outlet pipe
10: Vinyl ester inlet pipe
11, 12: Refrigerant pipe
13: Gas discharge pipe
21: Maxblend blade
22: Supermix MR203
23: Supermix MR205
24: Fullzone blade

The invention claimed is:

1. A multilayer structure, comprising:
a first layer comprising an ethylene-vinyl alcohol copolymer having an ethylene unit content of 1 mol % or more and less than 20 mol %, a viscosity-average polymerization degree of from 200 to 5000, and a saponification degree of from 80 to 99.7 mol %, wherein a block character of ethylene units is from 0.90 to 0.99; and
a second layer comprising at least one resin selected from the group consisting of a polyolefin resin, a polyester resin and a polyamide resin.

2. The multilayer structure according to claim 1, wherein a thickness of the first layer is from 0.1 to 20 μm.

3. The multilayer structure according to claim 1, wherein the first layer further comprises from 0.000001 to 0.01 parts by mass of a compound having a conjugated double bond with a molecular weight of 1000 or less based on 100 parts by mass of the ethylene-vinyl alcohol copolymer.

4. A method for producing the multilayer structure according to claim 1, the method comprising:
preparing an aqueous solution comprising the ethylene-vinyl alcohol copolymer to give a coating agent, and
applying the coating agent to a surface of a substrate made of at least one selected from the group consisting of a polyolefin resin, a polyester resin and a polyamide resin.

5. The production method according to claim 4, wherein after 1 to 30 days from preparing the coating agent, the coating agent is applied to the surface of the substrate.

6. A packaging material having the multilayer structure according to claim 1.

* * * * *